United States Patent
Kitamura (10) Patent No.: US 10,166,735 B2
(45) Date of Patent: Jan. 1, 2019

(54) PRESS MACHINE

(71) Applicant: Fanuc Corporation, Yamanashi (JP)

(72) Inventor: Ryouji Kitamura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 116 days.

(21) Appl. No.: 15/490,195

(22) Filed: Apr. 18, 2017

(65) Prior Publication Data

US 2017/0313015 A1 Nov. 2, 2017

(30) Foreign Application Priority Data

Apr. 28, 2016 (JP) ................. 2016-090940

(51) Int. Cl.
| | |
|---|---|
| B30B 15/32 | (2006.01) |
| B29C 43/04 | (2006.01) |
| B30B 11/04 | (2006.01) |
| B30B 15/04 | (2006.01) |
| B21D 45/00 | (2006.01) |
| B21D 45/02 | (2006.01) |
| B29B 17/00 | (2006.01) |
| B29C 43/32 | (2006.01) |
| B30B 1/18 | (2006.01) |

(52) U.S. Cl.
CPC .............. *B30B 15/32* (2013.01); *B21D 45/00* (2013.01); *B21D 45/02* (2013.01); *B29C 43/04* (2013.01); *B30B 11/04* (2013.01); *B30B 15/047* (2013.01); *B29B 17/00* (2013.01); *B29C 2043/3283* (2013.01); *B30B 1/18* (2013.01)

(58) Field of Classification Search
CPC ........ B21D 45/00; B21D 45/02; B21D 45/04; B30B 11/04; B30B 15/0082; B30B 15/32; B29C 43/04; B29C 2043/3283; B29B 17/00
See application file for complete search history.

(56) References Cited

U.S. PATENT DOCUMENTS 5,044,919 A * 9/1991 Hama ................ B29C 33/26
249/161

FOREIGN PATENT DOCUMENTS

| JP | S59-180826 U | 12/1984 |
|---|---|---|
| JP | H03-47628 U | 5/1991 |
| JP | H06-114466 A | 4/1994 |
| JP | H08187530 A | 7/1996 |
| JP | 2000141159 A | 5/2000 |
| JP | 2005-262294 A | 9/2005 |
| JP | 2015-85359 A | 5/2015 |

OTHER PUBLICATIONS

Japan Patent Office, Decision to Grant a Patent dated Apr. 24, 2018 for Japan Patent Application No. 2016-090940.

* cited by examiner

*Primary Examiner* — James P Mackey
(74) *Attorney, Agent, or Firm* — Winstead PC (57) ABSTRACT

A press machine includes a frame, a press shaft, a lower mold support rotatably attached to the frame about a first axis line and configured to support a lower mold, a lower mold support rotating device configured to rotate the lower mold support about the first axis line, a scrap shooter configured to receive a scrap falling from the lower mold, and a link member one end part of which is rotatably coupled to the lower mold support about a second axis line, Wherein the scrap shooter has one end side rotatably coupled to the other end part of the link member about a third axis line, and has the other end side rotatably supported by the frame or another support member about a fourth axis line.

5 Claims, 9 Drawing Sheets

PRESS MACHINE

CROSS-REFERENCE TO RELATED APPLICATIONS

This application is based on Japanese Patent Application No. 2016-090940 filed on Apr. 28, 2016, the content of which is incorporated herein by reference.

TECHNICAL FIELD

The present invention relates to a press machine, and more specifically, relates to a press machine having a scrap ejecting function.

BACKGROUND ART

A known scrap ejecting device of such a press machine conveys scraps generated by press forming to a predetermined scrap ejecting position through a conveyor belt (refer to PTL 1, for example).

Another known scrap ejecting device (refer to PTL 2, for example) includes a lid of a work shooter, defining a plane surface with a fabrication table, and a lid support means configured to support the lid and configured to move the lid from a horizontal position to a tilt position. The lid is tilted to move scraps to a predetermined scrap ejecting position.

CITATION LIST

Patent Literature

{PTL 1}
Japanese Unexamined Patent Application, Publication No. H08-187530
{PTL 2}
Japanese Unexamined Patent Application, Publication No. 2000-141159

SUMMARY OF INVENTION

A press machine according to a first aspect of the present invention includes a frame; a press shaft configured to move upward and downward relative to the frame; a lower mold support attached to the frame so that the lower mold support can rotate about a first axis line and configured to support a lower mold in a corresponding manner to an upper mold attached to a lower end part of the press shaft; a lower mold support rotating mechanism configured to rotate the lower mold support about the first axis line; a scrap shooter disposed at a position toward which the lower mold support rotates and configured to receive a scrap to be fallen from the lower mold when the lower mold support is rotated by the lower mold support rotating mechanism to tilt the lower mold downward; and a link member one end part of which is coupled to the lower mold support so that the link member can rotate about a second axis line, wherein one end side of the scrap shooter is coupled to the other end part of the link member so that the scrap shooter can rotate about a third axis line, and the other end side of the scrap shooter is coupled to the frame or another support member so that the scrap shooter can rotate about a fourth axis line.

DESCRIPTION OF EMBODIMENTS

A press machine according to an embodiment of the present invention will be described below with reference to the drawings.

Figure 1:
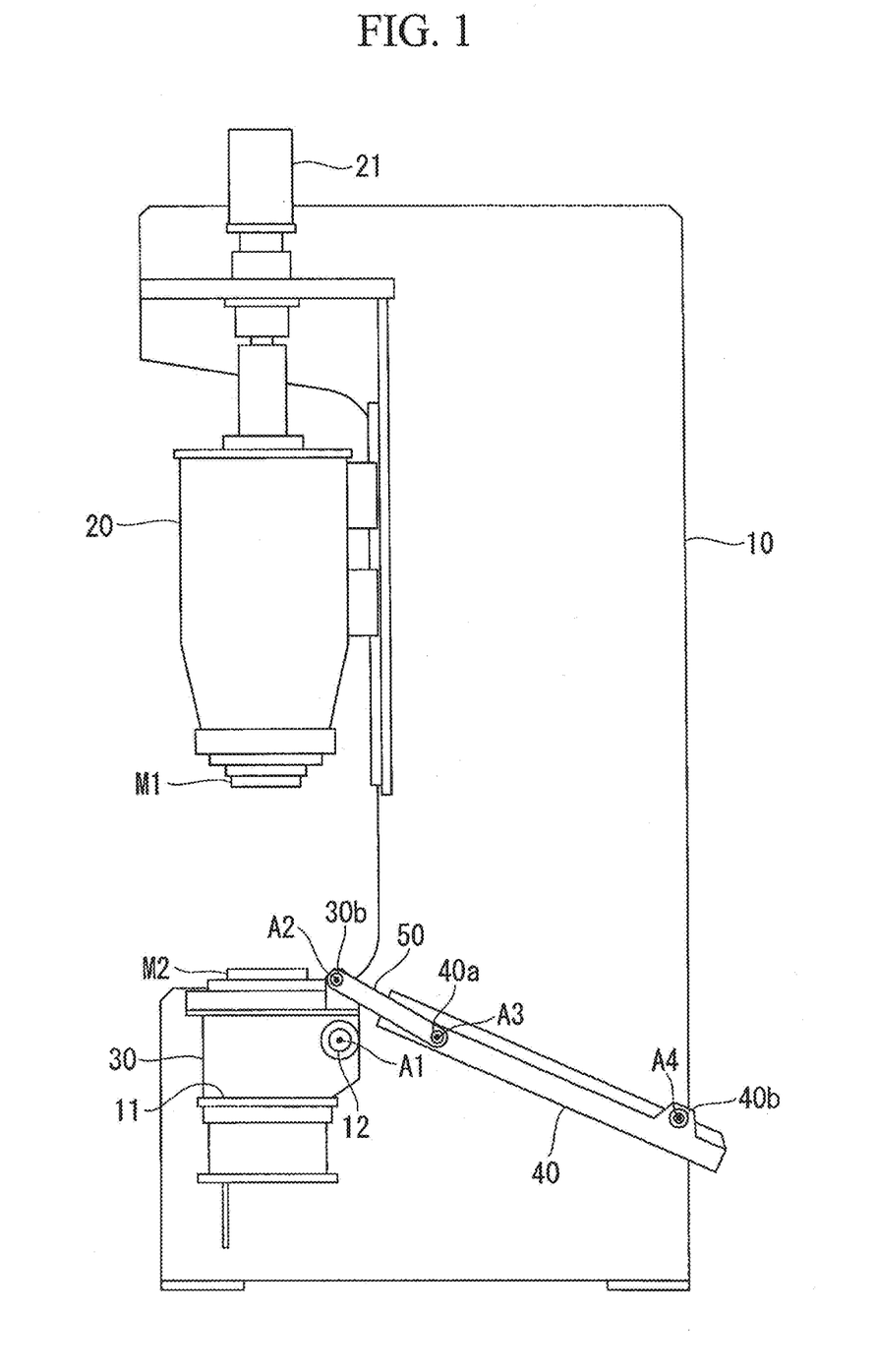
FIG. 1 is a schematic configuration diagram of a press machine according to an embodiment of the present invention.
Figure 2:
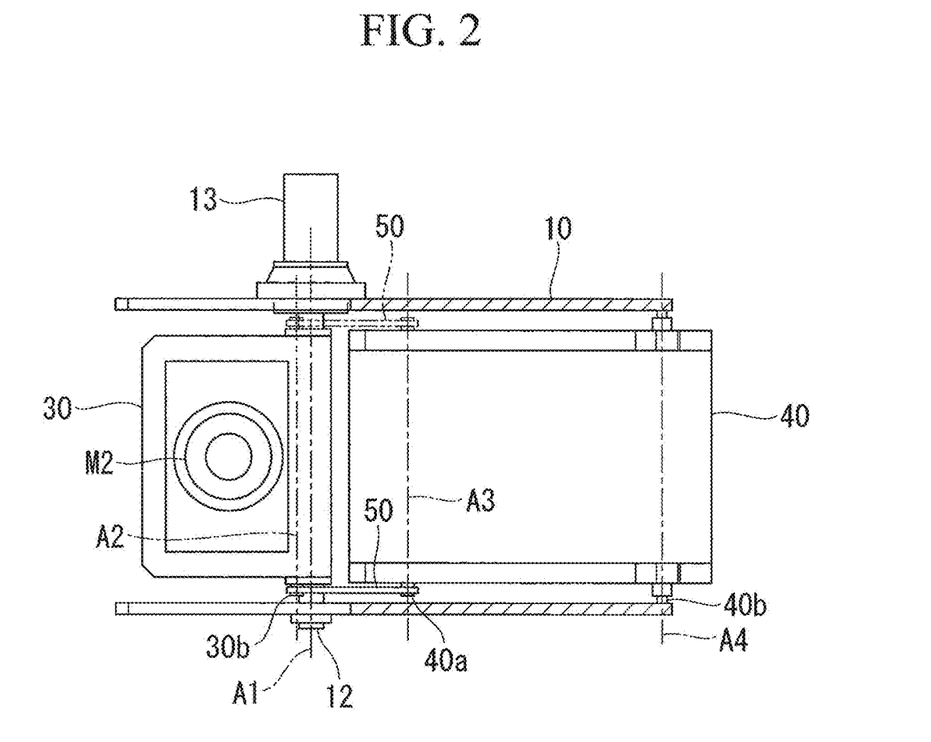
FIG. 2 is a cross-sectional view of the press machine illustrated in FIG. 1.

As illustrated in FIGS. 1 and 2, this press machine includes a frame 10 mounted on a base, a press shaft 20 that is provided on the frame 10 to move upward and downward and to a lower end of which a press forming upper mold M1 is attached, a lower mold support 30 that is attached to the frame 10 and to which a lower mold M2 is attached in a corresponding manner to the upper mold M1 attached to the lower end of the press shaft 20, a scrap shooter 40 supported by the frame 10, and a pair of link members 50 one end part of each of which is coupled to the lower mold support 30 and the other end part of each of which is coupled to the scrap shooter 40.

The press shaft 20 is supported by the frame 10 to move upward and downward. A mechanism configured to move the press shaft 20 upward and downward may be achieved by a well-known mechanism configured to move the press shaft 20 upward and downward by using a hydraulic cylinder, or a well-known mechanism configured to move the press shaft 20 upward and downward by using a servomotor and a screw such as a ball screw. Alternatively, a well-known mechanism configured to move the press shaft 20 upward and downward by using a servomotor, a screw, and a link, or a well-known mechanism configured to move the press shaft 20 upward and downward by using a motor, and a crank or a cam may be employed.

In the present embodiment, for example, a female screw hole extending in an axial direction of the press shaft 20 is provided in the press shaft 20, and a ball screw rotatably supported by the frame 10 is screwed with this female screw hole. A pulley and a gear are fixed to an upper end part of this ball screw, and rotational force of a servomotor 21 is transferred to the pulley and the gear through a decelerator. Rotation of the press shaft 20 relative to the frame 10 is regulated, and upward and downward movement of the ball screw relative to the frame 10 is regulated. With this configuration, when the servomotor 21 is rotated, the press shaft 20 moves upward and downward.

The lower mold support 30 is supported from a lower position by a support surface 11 of the frame 10 and rotatably attached to the frame 10 about a first axis line A1. For example, a spindle 12 extending in the horizontal direction is inserted into and fixed to part of the lower mold support 30 and the spindle 12 is rotatably supported by the frame 10. Accordingly, the lower mold support 30 is rotatably attached to the frame 10 about a central axis of the spindle 12. A shaft bush such as a bearing is preferably provided between the frame 10 and the spindle 12.

Figure 8:
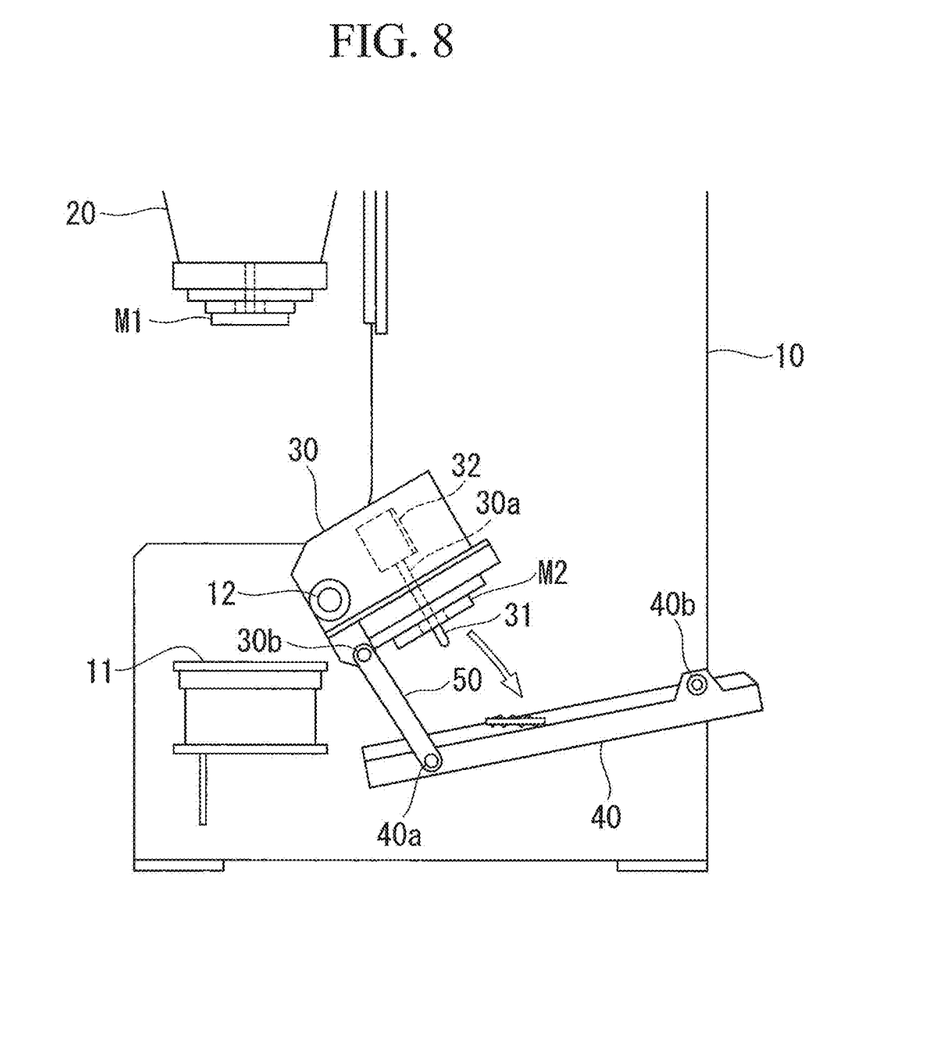
FIG. 8 is an operation explanatory diagram of the press machine according to the present embodiment.

The press forming lower mold M2 is attached to an upper surface of the lower mold support 30. As illustrated in FIG. 8, an ejector pin 31 and an air cylinder 32 configured to move the ejector pin 31 upward and downward are provided in the lower mold support 30. These components serve as an ejector. An ejector pin hole 30a extending in the vertical direction is provided in the lower mold support 30, and a hole extending in the vertical direction is provided to the lower mold M2 at a position corresponding to the ejector pin hole 30a. The ejector pin 31 is disposed in the ejector pin hole 30a. The ejector pin 31 is moved by the air cylinder 32 between a position at which the tip end of the ejector pin 31 protrudes from the hole of the lower mold M2 and a position at which the tip end does not protrude from the hole of the lower mold M2.

The one end part of each link member 50 is coupled to the lower mold support 30 so as to be rotatable about a second axis line A2. For example, the lower mold support 30 is provided with a pair of shafts 30b that extend in the horizontal direction and to each of which the one end part of the corresponding link member 50 is rotatably coupled. Accordingly, each link member 50 is rotatably coupled to the lower mold support 30 about a central axis of the corresponding shaft 30b.

The other end part of each link member 50 is coupled to one end side of the scrap shooter 40 so as to be rotatable about a third axis line A3. For example, the one end side of the scrap shooter 40 is provided with a pair of shafts 40a that extend in the horizontal direction and to each of which the other end part of the corresponding link member 50 is rotatably coupled. Accordingly, each link member 50 is rotatably coupled to the scrap shooter 40 about a central axis of the corresponding shaft 40a.

The other end side of the scrap shooter 40 is coupled to the frame 10 about a fourth axis line A4. For example, the other end side of the scrap shooter 40 is provided with a pair of shafts 40b that extend in the horizontal direction and to each of which the frame 10 is rotatably coupled. Accordingly, the other end side of the scrap shooter 40 is rotatably coupled to the frame 10 about a central axis of each shaft 40b. In the present embodiment, the first to fourth axis lines A1 to A4 extend in the horizontal direction or substantially in the horizontal direction.

A lower mold support rotating device 13 including a servomotor is fixed to the frame 10, and the lower mold support rotating device 13 is configured to rotate the spindle 12. With this configuration, the lower mold support 30 is separated from the support surface 11 and rotated toward the scrap shooter 40 by the lower mold support rotating device 13, and is rotated also toward the support surface 11 by the lower mold support rotating device 13.

The second axis line A2 is disposed at a position different from that of the first axis line A1 in a direction orthogonal to the second axis line A2. With this configuration, the position of the second axis line A2 moves toward the scrap shooter 40 or the support surface 11 in the horizontal direction in response to rotation of the lower mold support 30.

The third axis line A3 is disposed between the second axis line A2 and the fourth axis line A4 in the horizontal direction. Since the positions of the first axis line A1 and the fourth axis line A4 are fixed by the frame 10, the distance between the first axis line A1 and the fourth axis line A4 does not change when the lower mold support 30 is rotated.

Thus, when the lower mold support 30 is rotated toward the scrap shooter 40 by the lower mold support rotating device 13 from a situation where a lower surface of the lower mold support 30 is supported by the support surface 11, the distance between the second axis line A2 and the fourth axis line A4 becomes shorter and the third axis line A3 moves downward accordingly. In other words, the one end side of the scrap shooter 40 moves downward. In contrast, when the lower surface of the lower mold support 30 is rotated to contact the support surface 11, the distance between the second axis line A2 and the fourth axis line A4 becomes longer and the third axis line A3 moves upward accordingly. In other words, the one end side of the scrap shooter 40 moves upward.

The following explanation discloses operation of the above-described press machine with reference to the drawings.

Figure 3:
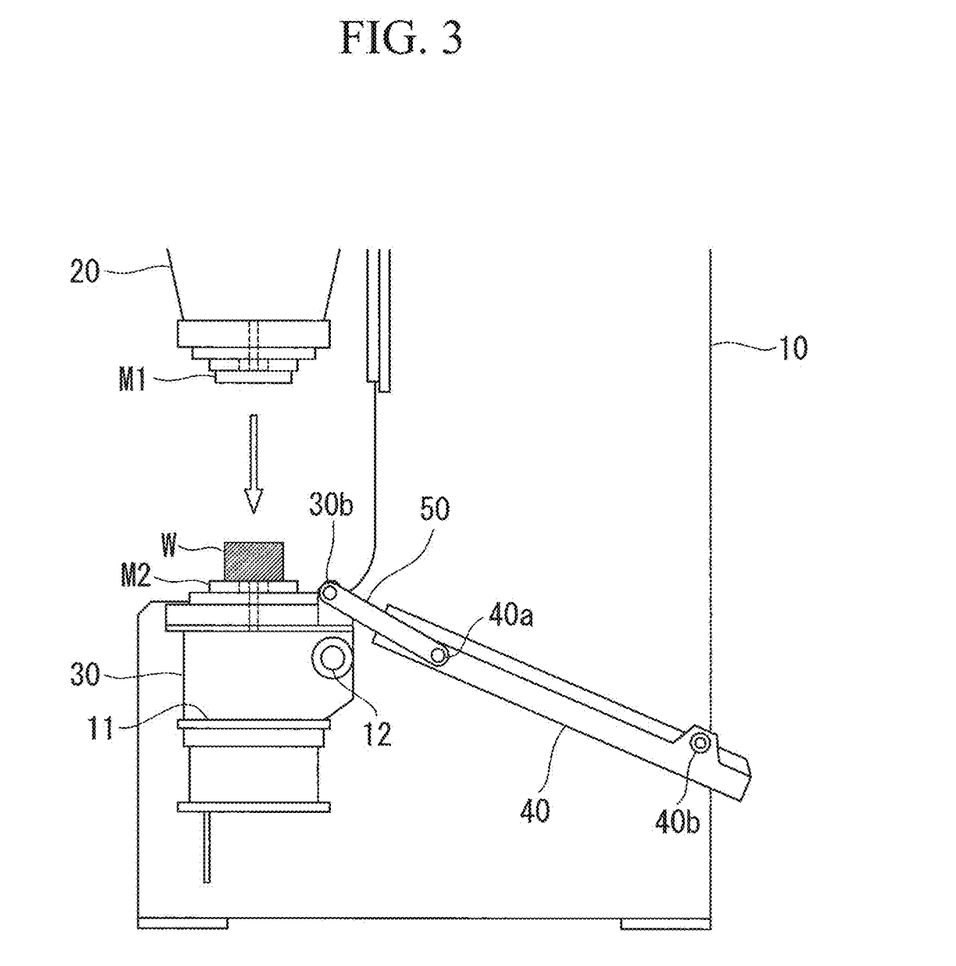
FIG. 3 is an operation explanatory diagram of the press machine according to the present embodiment.
Figure 4:
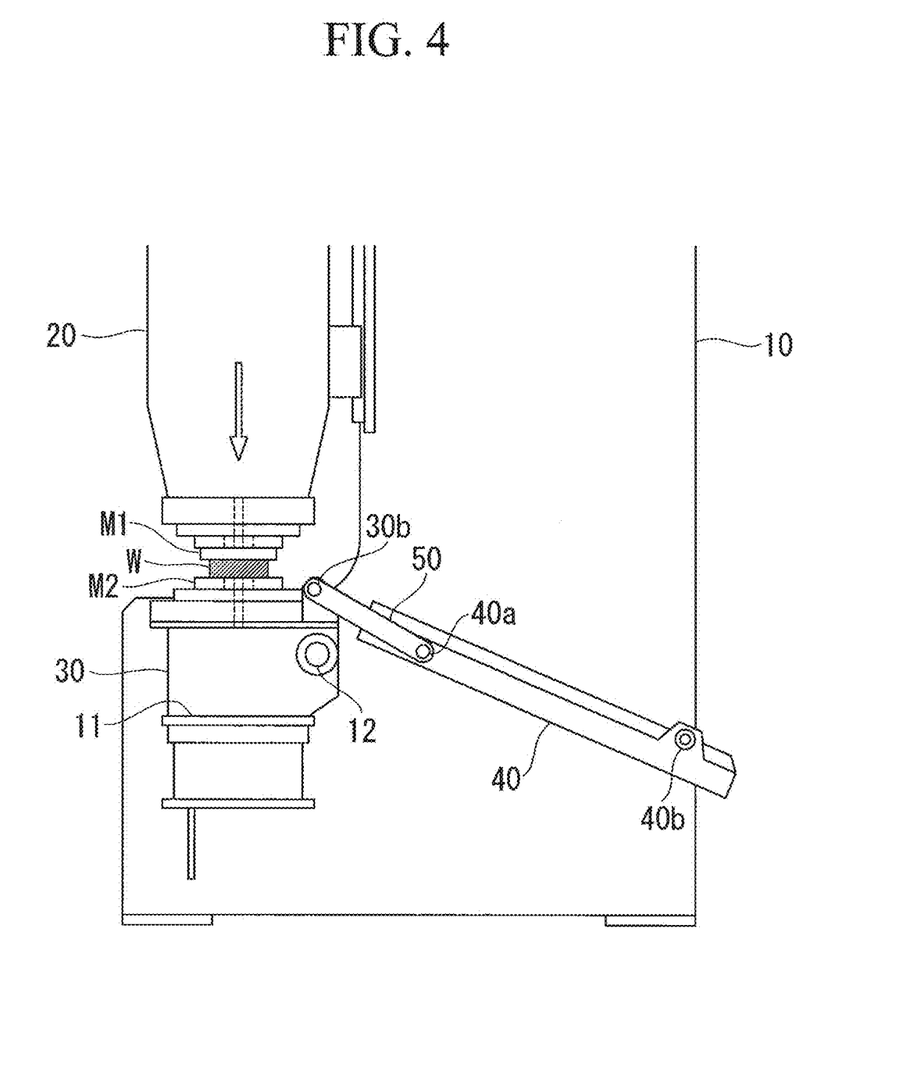
FIG. 4 is an operation explanatory diagram of the press machine according to the present embodiment.
Figure 5:
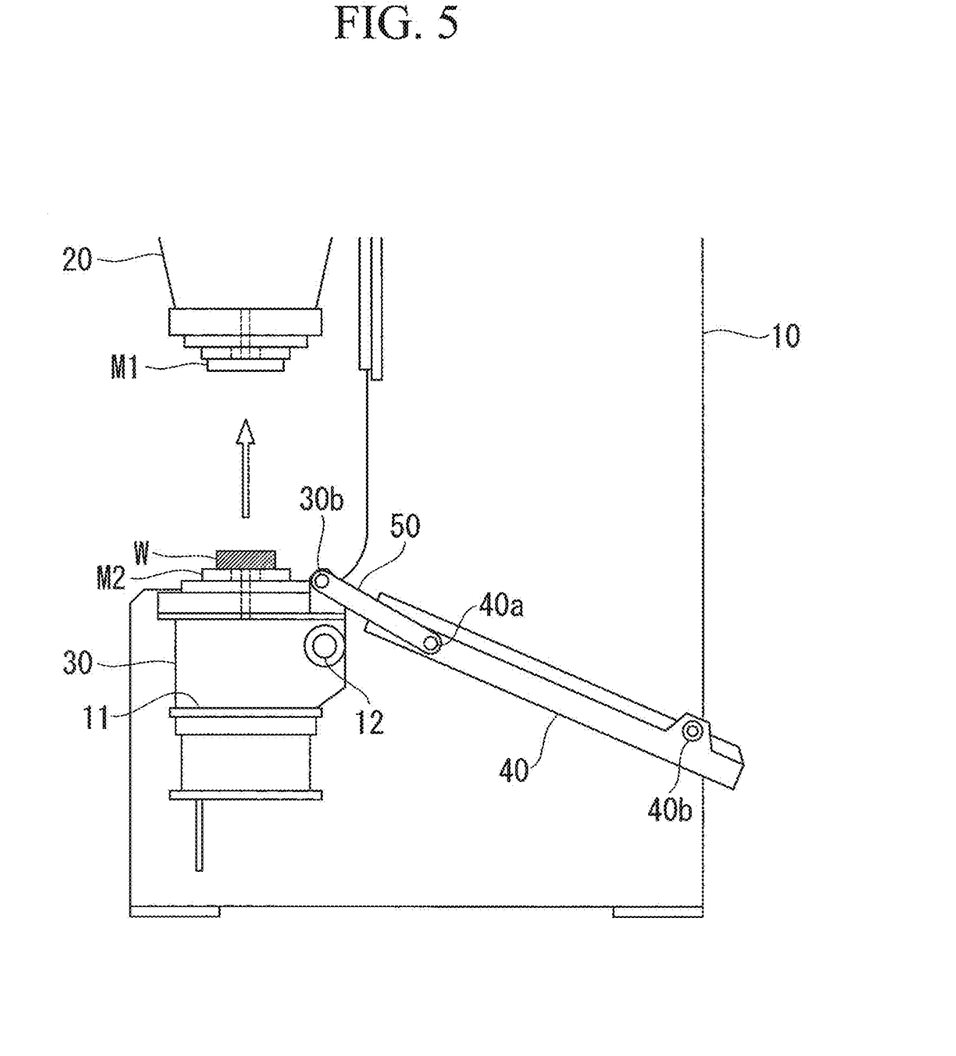
FIG. 5 is an operation explanatory diagram of the press machine according to the present embodiment.

First, as illustrated in FIG. 3, a work conveyance device such as a robot or a worker places work W on the lower mold M2 when the press shaft 20 is positioned above. Then, when a press forming operation is started, the press shaft 20 moves downward as illustrated in FIG. 4 to perform fabrication of work W such as cutting, hole formation, or plastic deformation between the upper mold M1 and the lower mold M2, and then moves upward as illustrated in FIG. 5. The work conveyance device or the worker moves the fabricated work W from the lower mold M2 to another place.

Figure 6:
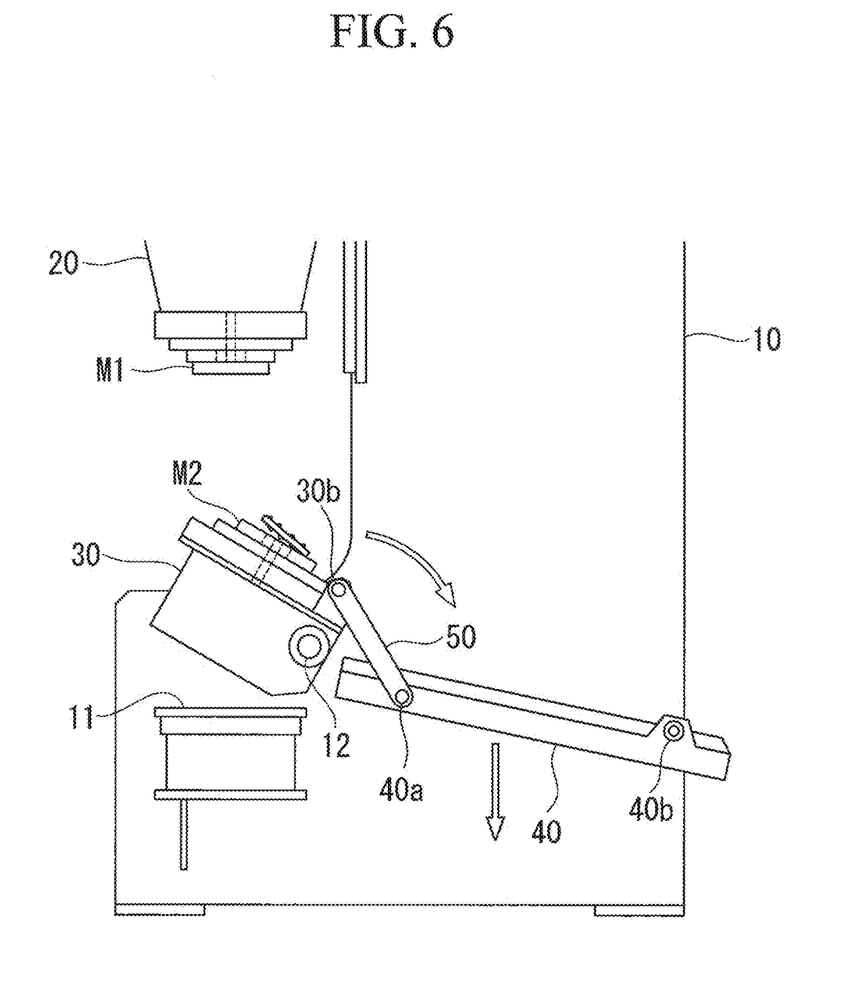
FIG. 6 is an operation explanatory diagram of the press machine according to the present embodiment.

At this stage, the scrap of the work generated through the fabrication or the like may remain on the lower mold M2. As illustrated in FIG. 6, in this press machine, the lower mold support rotating device 13 rotates the lower mold support 30 toward the scrap shooter 40. Through this operation, the lower mold M2 on the lower mold support 30 tilts toward the scrap shooter 40. The rotation angle of the lower mold support 30 from a position at which the lower mold support 30 is in contact with the support surface 11 is not particularly limited, but is preferably 90 [degree] or larger. In this configuration, the scrap on the lower mold M2 is placed in a situation where the scrap falls easily.

Figure 7:
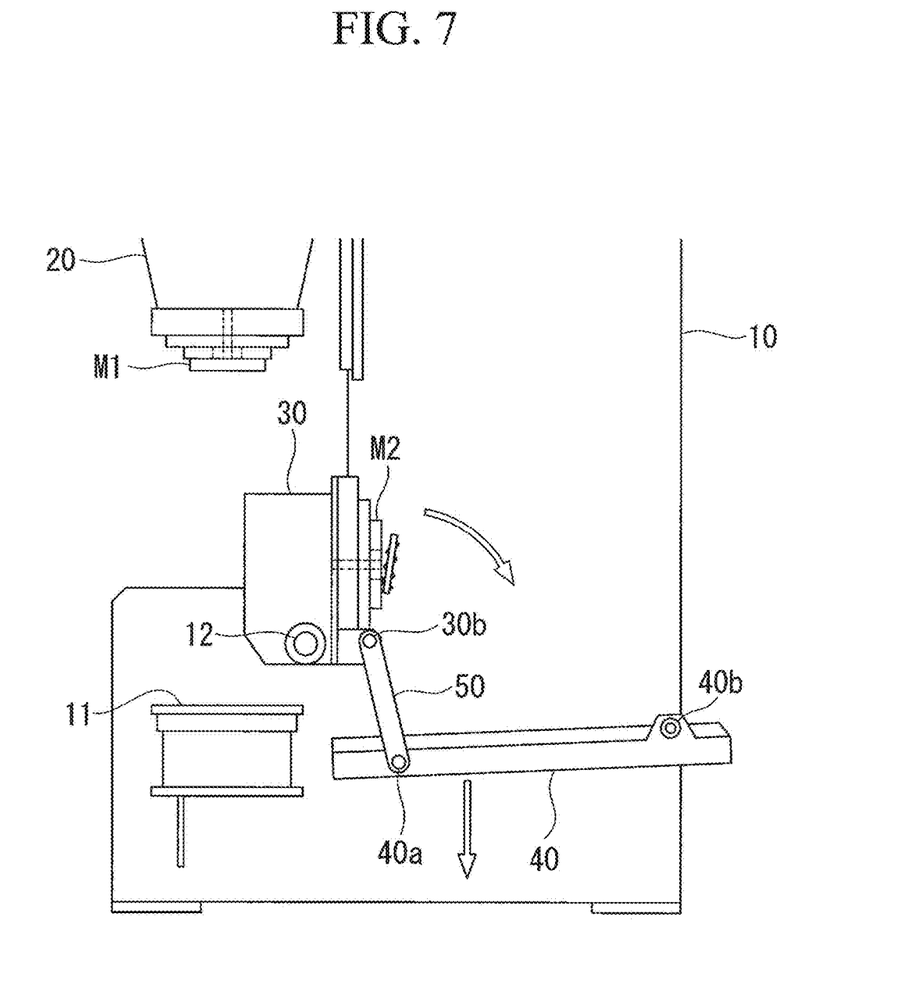
FIG. 7 is an operation explanatory diagram of the press machine according to the present embodiment.

As illustrated in FIGS. 7 and 8, the lower mold support 30 is preferably rotated until the lower mold M2 is disposed over the scrap shooter 40. Subsequently, in the state illustrated in FIG. 7 or 8, the ejector pin 31 is protruded from the lower mold M2 by the air cylinder 32. Accordingly, the scrap remaining on the lower mold M2 can fall onto the scrap shooter 40.

Figure 9:
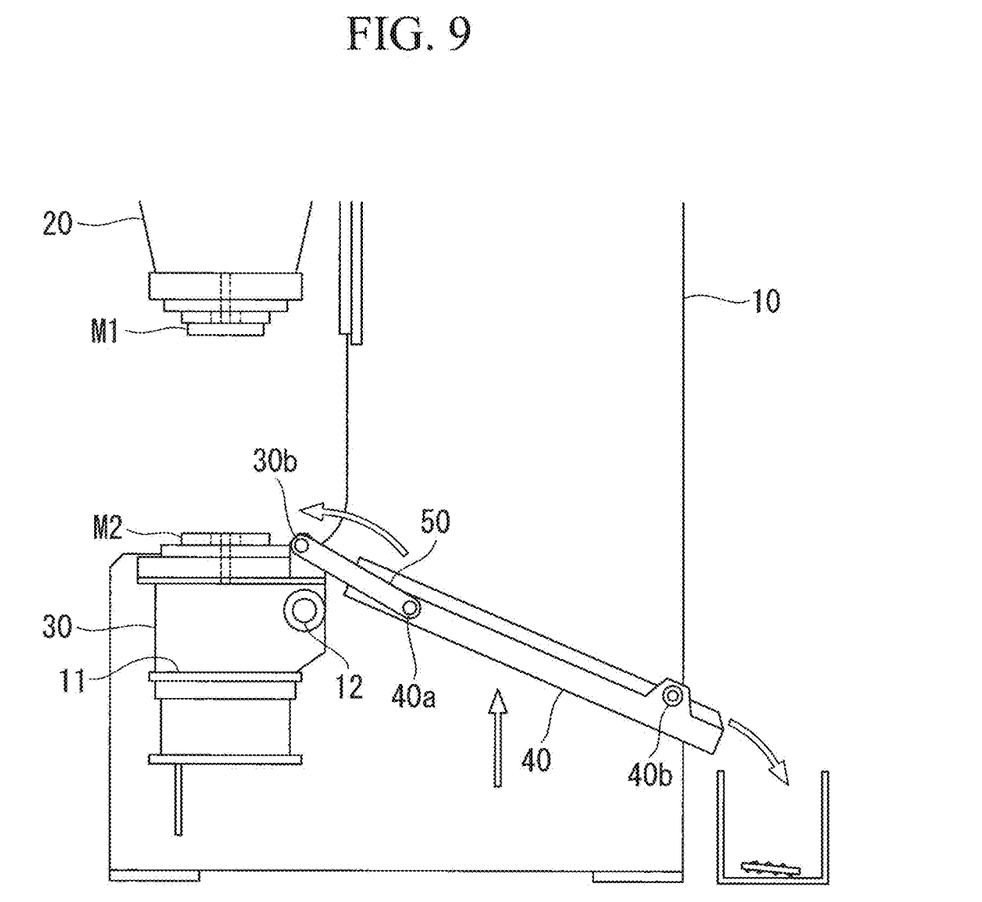
FIG. 9 is an operation explanatory diagram of the press machine according to the present embodiment.

Thereafter, as illustrated in FIG. 9, the ejector pin 31 is moved by the air cylinder 32 into a state not protruding from the lower mold M2, and the lower surface of the lower mold support 30 is made to come into contact with the support surface 11 by the lower mold support rotating device 13. Accordingly, as described above, the distance between the second axis line A2 and the fourth axis line A4 becomes longer, and the one end side of the scrap shooter 40 moves upward. This is advantageous in preventing the scrap from staying on the scrap shooter 40.

As described above, according to the present embodiment, when the lower mold support 30 is rotated about the first axis line A1 by the lower mold support rotating device 13, the lower mold M2 supported by the lower mold support 30 tilts, which makes the scrap remained on the lower mold M2 more likely to fall onto the scrap shooter 40.

In the present embodiment, the one end part of each link member 50 is rotatably coupled with the lower mold support 30 about the second axis line A2 different from the first axis line A1. The link member 50 and the scrap shooter 40 are relatively rotatable about the third axis line A3 between the second axis line A2 and the fourth axis line A4.

With this configuration, when the lower mold support 30 is rotated toward the scrap shooter 40 to cause the scrap on the lower mold M2 to fall onto the scrap shooter 40, the second axis line A2 moves closer to the fourth axis line A4 in the horizontal direction, and the link members 50 and the scrap shooter 40 relatively rotate about the third axis line A3.

In other words, the one end side of the scrap shooter 40 moves upward and downward in response to rotation of the lower mold support 30: the one end side of the scrap shooter 40 moves downward when the lower mold support 30 is rotated toward the scrap shooter 40 to cause a scrap on the lower mold M2 to fall onto the scrap shooter 40; and the one end side of the scrap shooter 40 moves upward when the lower mold support 30 is rotated back to the original position at which the lower mold M2 corresponds to the upper mold M1.

In this manner, the one end side of the scrap shooter 40 moves upward and downward along with rotation of the lower mold support 30, and thus it is possible to prevent the scrap from staying on the scrap shooter 40 without a dedicated power source configured to move the scrap on the scrap shooter 40, which allows reduction in manufacturing cost.

In the present embodiment, the axis lines A1 to A4 are parallel to each other. Such a configuration is advantageous in smoothly moving the scrap shooter 40 upward and downward when the lower mold support 30 is rotated by the lower mold support rotating device 13. When the axis lines A1 to A4 are not parallel to each other, it is still possible to smoothly move the link members 50 and the scrap shooter 40.

The press shaft 20 is moved upward and downward by a servomotor, and the lower mold support rotating device 13 includes a servomotor. This allows the upward and downward movement of the press shaft 20 and the rotation position of the lower mold support 30 to be controlled with a simple configuration, and thus the press shaft 20 and the lower mold support 30 can be each moved within a minimum necessary operation range, which leads to reduction in a cycle time.

The lower mold support 30 includes the ejector pin 31 and the air cylinder 32, which serve as an ejector mechanism configured to remove the scrap from the lower mold M2 when the lower mold support 30 is rotated by the lower mold support rotating device 13. This configuration enables removal of any scrap that is difficult to remove from the lower mold M2 only through rotation of the lower mold support 30.

A mechanism configured to remove the scrap from the lower mold M2 is achieved by the ejector pin 31 disposed in the lower mold support 30 to protrude from the lower mold M2 supported by the lower mold support 30, and the air cylinder 32 configured to move the ejector pin 31 to protrude from the lower mold M2. This configuration allows reduction in the size and weight of a mechanism configured to remove any scrap difficult to remove, and reduction in the size and weight of the lower mold support 30 accordingly, thereby achieving improved operation performance of the lower mold support 30.

Although the lower mold support rotating device 13 includes a servomotor in the above-described embodiment, any drive means, such as another kind of motor or a cylinder, capable of rotating the lower mold support 30 is applicable.

Although the ejector pin 31 and the air cylinder 32 are used to remove the scrap remaining on the lower mold M2 in the above-described embodiment, the remaining scrap may be removed by using compression air in place of the ejector pin 31 and the air cylinder 32, or may be removed by force applied in any other method.

The other end side of the scrap shooter 40 may be rotatably supported by a support member other than the frame 10, such as a column fixed to the base part, about the fourth axis line A4, and the above-described operation is achieved in this case, too.

The inventor has arrived at the following aspects of the present invention.

A press machine according to a first aspect of the present invention includes a frame; a press shaft configured to move upward and downward relative to the frame; a lower mold support attached to the frame so that the lower mold support can rotate about a first axis line and configured to support a lower mold in a corresponding manner to an upper mold attached to a lower end part of the press shaft; a lower mold support rotating mechanism configured to rotate the lower mold support about the first axis line; a scrap shooter disposed at a position toward which the lower mold support rotates and configured to receive a scrap to be fallen from the lower mold when the lower mold support is rotated by the lower mold support rotating mechanism to tilt the lower mold downward; and a link member one end part of which is coupled to the lower mold support so that the link member can rotate about a second axis line, wherein one end side of the scrap shooter is coupled to the other end part of the link member so that the scrap shooter can rotate about a third axis line, and the other end side of the scrap shooter is coupled to the frame or another support member so that the scrap shooter can rotate about a fourth axis line.

In this aspect, when the lower mold support is rotated about the first axis line by the lower mold support rotating mechanism, the lower mold supported by the lower mold support tilts, which makes the scrap remaining on the lower mold fall onto the scrap shooter easily.

In this aspect, the one end part of the link member is rotatably coupled to the lower mold support about the second axis line different from the first axis line. The link member and the scrap shooter are relatively rotatable about the third axis line between the second axis line and the fourth axis line. With this configuration, when the lower mold support is rotated toward the scrap shooter to cause the scrap on the lower mold to fall onto the scrap shooter, for example, the second axis line moves closer to the fourth axis line in the horizontal direction, and the link member and the scrap shooter relatively rotate about the third axis line.

In other words, the one end side of the scrap shooter moves upward and downward in response to rotation of the lower mold support. The one end side of the scrap shooter moves downward when the lower mold support is rotated toward the scrap shooter to cause the scrap on the lower mold to fall onto the scrap shooter, and the one end side of the scrap shooter moves upward when the lower mold support is rotated back to the original position at which the lower mold can correspond to the upper mold.

In this manner, the one end side of the scrap shooter moves upward and downward along with rotation of the lower mold support, and thus it is possible to prevent the scrap from staying on the scrap shooter without a dedicated power source configured to move the scrap on the scrap shooter, which also allows reduction in manufacturing cost.

In the above-described aspect, the first, second, third, and fourth axis lines are preferably parallel to each other.

This allows the rotation of the lower mold support and the upward and downward movement of the one end side of the scrap shooter to be smoothly achieved with a simple configuration.

In the above-described aspect, it is preferable that the press shaft is moved upward and downward by a servomotor and the lower mold support rotating mechanism is driven by a servomotor.

This allows the upward and downward movement of the press shaft and the rotation position of the lower mold support to be controlled with a simple configuration, and thus the press shaft and the lower mold support can be each moved within a minimum necessary operation range, which leads to reduction in a cycle time.

In the above-described aspect, the lower mold support preferably includes an ejector configured to remove the scrap from the lower mold when the lower mold support is rotated by the lower mold support rotating mechanism.

This configuration enables removal of any scrap that is difficult to remove from the lower mold only through rotation of the lower mold support.

In the above-described aspect, the ejector preferably includes an ejector pin disposed in the lower mold support so that the ejector pin can protrude from the lower mold supported by the lower mold support, and an air cylinder configured to move the ejector pin to protrude from the lower mold.

This allows reduction in the size and weight of a mechanism configured to remove any scrap difficult to remove, and reduction in the size and weight of the lower mold support accordingly, thereby achieving improved operation performance of the lower mold support.

The aforementioned aspects can achieve efficient ejection of the scrap on a lower mold.

REFERENCE SIGNS LIST 10 frame
11 support surface
12 spindle
13 lower mold support rotating device
20 press shaft
21 servo motor
30 lower mold support
31 ejector pin
32 air cylinder
40 scrap shooter
50 link member
A1 first axis line
A2 second axis line
A3 third axis line
A4 fourth axis line

The invention claimed is:

1. A press machine comprising:
a frame;
a press shaft configured to move upward and downward relative to the frame;
a lower mold support attached to the frame so that the lower mold support can rotate about a first axis line and configured to support a lower mold in a corresponding manner to an upper mold attached to a lower end part of the press shaft;
a lower mold support rotating means configured to rotate the lower mold support about the first axis line;
a scrap shooter disposed at a position toward which the lower mold support rotates and configured to receive a scrap to be fallen from the lower mold when the lower mold support is rotated by the lower mold support rotating means to tilt the lower mold downward; and
a link member one end part of which is coupled to the lower mold support so that the link member can rotate about a second axis line,
wherein one end side of the scrap shooter is coupled to the other end part of the link member so that the scrap shooter can rotate about a third axis line, and the other end side of the scrap shooter is coupled to the frame or another support member so that the scrap shooter can rotate about a fourth axis line.

2. The press machine according to claim 1, wherein the first, second, third, and fourth axis lines are parallel to each other.

3. The press machine according to claim 1 or 2, wherein the press shaft is moved upward and downward by a servomotor and the lower mold support rotating means is driven by a servomotor.

4. The press machine according to any one of claims 1 to 3, wherein the lower mold support includes an ejector configured to remove the scrap from the lower mold when the lower mold support is rotated by the lower mold support rotating means.

5. The press machine according to claim 4, wherein the ejector includes an ejector pin disposed in the lower mold support so that the ejector pin can protrude from the lower mold supported by the lower mold support, and an air cylinder configured to move the ejector pin to protrude from the lower mold.

* * * * *